US011312374B2

(12) United States Patent
Zhao et al.

(10) Patent No.: US 11,312,374 B2
(45) Date of Patent: Apr. 26, 2022

(54) PREDICTION OF ACCIDENT RISK BASED ON ANOMALY DETECTION

(71) Applicant: INTERNATIONAL BUSINESS MACHINES CORPORATION, Armonk, NY (US)

(72) Inventors: Kun Zhao, Funabashi (JP); Takayuki Katsuki, Tokyo (JP); Takayuki Yoshizumi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/778,757

(22) Filed: Jan. 31, 2020

(65) Prior Publication Data

US 2021/0237724 A1  Aug. 5, 2021

(51) Int. Cl.
*B60W 30/095* (2012.01)
*G06F 17/18* (2006.01)
(Continued)

(52) U.S. Cl.
CPC .......... *B60W 30/095* (2013.01); *B60W 50/14* (2013.01); *G06F 17/18* (2013.01); *G06V 20/597* (2022.01)

(58) Field of Classification Search
CPC ..... B60W 30/095; B60W 50/14; G06F 17/18; G06K 9/00845; G06K 9/00791;
(Continued)

(56) References Cited

U.S. PATENT DOCUMENTS

2002/0111725 A1* 8/2002 Burge .................... G07C 5/008
701/31.4
2015/0025917 A1* 1/2015 Stempora ............. G06K 9/0061
705/4

(Continued)

FOREIGN PATENT DOCUMENTS

CN 107273340 A 10/2017
CN 107909678 A 4/2018
(Continued)

OTHER PUBLICATIONS

Dastkhan, "Network-based Early Warning System to Predict Financial Crisis", Available at: https://papers.ssrn.com/sol3/papers.cfm?abstract_id=3314820, Jan. 2019, pp. 1-31.
(Continued)

*Primary Examiner* — Hai Phan
*Assistant Examiner* — Anthony D Afrifa-Kyei
(74) *Attorney, Agent, or Firm* — Tutunjian & Bitetto, P.C.; Joseph Petrokaitis

(57) ABSTRACT

A computer-implemented method of predicting a risk of an accident is disclosed. The method includes computing an anomaly score based on sensor data to obtain a series of anomaly scores. The method also includes processing the anomaly score to limit a processed anomaly score below a predetermined value. The method further includes calculating an accident risk score at time of prediction by using a series of processed anomaly scores up to the time of the prediction. The method includes further outputting a prediction result based on the accident risk score.

18 Claims, 8 Drawing Sheets

(51) Int. Cl.
*B60W 50/14* (2020.01)
*G06V 20/59* (2022.01)

(58) Field of Classification Search
CPC ............. G06K 9/00832; G06K 9/6262; G06K 9/6273; G06K 9/629; G06Q 40/08; G06Q 50/30; G06N 20/00; G06N 7/005; G08G 1/164; G07C 5/008
See application file for complete search history.

(56) References Cited

U.S. PATENT DOCUMENTS

| | | | |
|---|---|---|---|
| 2017/0161614 A1* | 6/2017 | Mehta | G06N 20/00 |
| 2018/0034685 A1* | 2/2018 | Naous | H04L 43/028 |
| 2018/0241762 A1* | 8/2018 | Savalle | G06N 3/006 |
| 2018/0275642 A1* | 9/2018 | Tajima | G06N 3/0454 |
| 2019/0263417 A1* | 8/2019 | Rau | H04W 4/44 |
| 2019/0378050 A1* | 12/2019 | Edkin | G06N 20/20 |
| 2020/0057956 A1* | 2/2020 | Phan | G06N 20/00 |
| 2020/0219372 A1* | 7/2020 | Kwatra | G06F 16/906 |
| 2020/0334228 A1* | 10/2020 | Matyska | G06N 20/00 |
| 2020/0364800 A1* | 11/2020 | Fujii | G06N 5/04 |

FOREIGN PATENT DOCUMENTS

| | | |
|---|---|---|
| CN | 109840612 A | 6/2019 |
| KR | 20140071100 A | 6/2014 |

OTHER PUBLICATIONS

Khalil, "Automatic Road Accident Detection Techniques: A Brief Survey", ResearchGate, Nov. 2017, pp. 1-7.

Miyahi et al., "Analysis of Driver Behavior based on Experiences of Road Traffic Incidents investigated by means of Questionnaires for the Reduction of Road Traffic Accidents", International Journal of ITS Research, Jul. 2008, pp. 1-10, vol. 6, No. 1.

Wilson, "Using Machine Learning to Predict Car Accident Risk", medium.com, May 2018, pp. 1-22.

* cited by examiner

PREDICTION OF ACCIDENT RISK BASED ON ANOMALY DETECTION

BACKGROUND

Technical Field

The present disclosure, generally, relates to accident risk prediction, more particularly, to a technique of predicting a risk of an accident using sensor data.

Description of Related Art

Techniques capable of predicting a risk of an accident before it occurs are a focus of development. If a traffic accident can be predicted before the accident occurs, a driver can take a necessary action to avoid the accident.

Although there are several technologies to detect a traffic accident, conventional techniques can only detect occurrence of an accident after the accident occurs. Some conventional techniques require geographic data or other information such as video image, radar data. The usage of such rich information leads to an increase in instrumentation and computational costs.

SUMMARY

According to an embodiment of the present invention, a computer-implemented method of predicting a risk of an accident is provided. The method includes computing an anomaly score based on sensor data to obtain a series of anomaly scores. The method also includes processing the anomaly score to limit a processed anomaly score below a predetermined value. The method further includes calculating an accident risk score at time of prediction by using a series of processed anomaly scores up to the time of the prediction. The method includes further outputting a prediction result based on the accident risk score.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Hereinafter, the present invention will be described with respect to particular embodiments, but it will be understood by those skilled in the art that the embodiments described below are mentioned only by way of examples and are not intended to limit the scope of the present invention.

One or more embodiments according to the present invention are directed to computer-implemented methods, computer systems and computer program products for predicting a risk of an accident by using an anomaly detection model, in which the risk of the accident to be predicted is a risk of occurring a traffic accident involving a target automobile whose sensor data is used as an input for the anomaly detection model.

Hereinafter, first referring to FIGS. 1-3, a computer system for predicting a risk of a traffic accident according to an exemplary embodiment of the present invention will be described. Then, referring to FIGS. 4 and 5, a method for predicting a risk of a traffic accident according to an exemplary embodiment of the present invention will be described. Then, with reference to FIG. 6, an exemplary embodiment of an apparatus implementing an accident risk prediction system according to one or more embodiments of the present invention will be described. Furthermore, with reference to FIG. 7, a computer system for predicting a risk of a traffic accident according to other exemplary embodiment of the present invention where general and driver-specific anomaly detection models are used to predict a risk of a traffic accident will be described. Finally, referring to FIG. 8, a hardware configuration of a computer system according to one or more embodiments of the present invention will be described.

Figure 1:
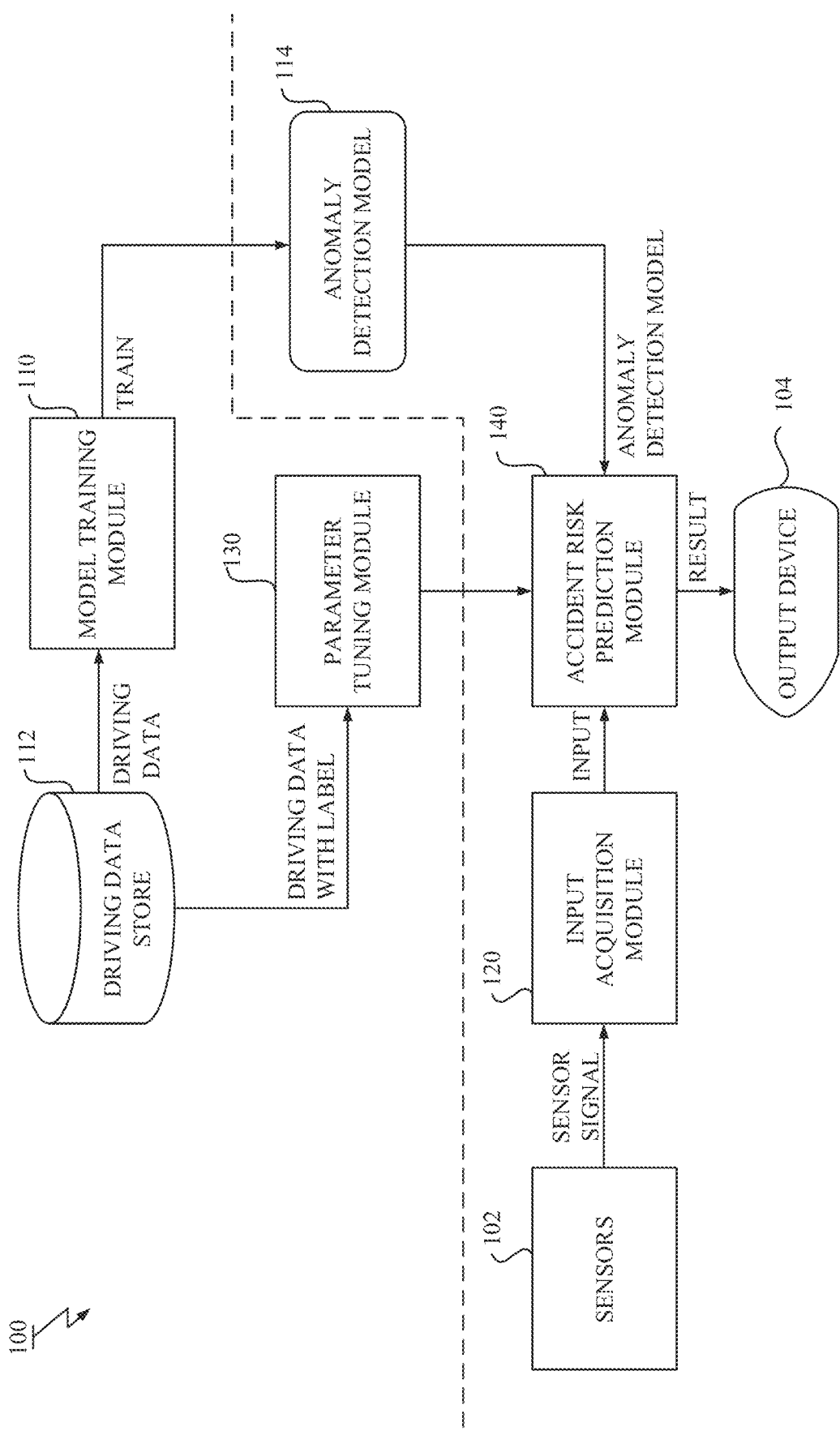
FIG. 1 illustrates a block diagram of an accident risk prediction system for predicting a risk of a traffic accident involving a target automobile according to an exemplary embodiment of the present invention.

Referring to FIG. 1, a block diagram of an accident risk prediction system 100 according to an exemplary embodiment of the present invention is described.

As shown in FIG. 1, the accident risk prediction system 100 includes sensors 102 for generating sensor signals; an input acquisition module 120 for acquiring the sensor signals from the sensors 102 to generate sensor data, an accident risk prediction module 140 for performing accident risk prediction based on the sensor data generated by the input acquisition module 120; and an output device 104 for outputting a result of the accident risk prediction.

The accident risk prediction performed by the accident risk prediction module 140 is based on an anomaly detection model 114. The accident risk prediction system 100 may also include a model training module 110 for training the anomaly detection model 114; and a driving data store 112 for storing a collection of driving data, which is used to train the anomaly detection model 114.

The accident risk prediction performed by the accident risk prediction module 140 also have one or more parameters. The accident risk prediction system 100 further includes a parameter tuning module 130 for tuning the one or more parameters of the accident risk prediction. The collection of the driving data stored in the driving data store 112 may also be used to tune the one or more parameters.

The sensors 102 may include one or more sensors, each of which is configured to output a sensor signal. The sensor signal is then transmitted to the input acquisition module 120. The sensor signal is acquired by the input acquisition module 120 in a form of digital signal with a predetermined sampling frequency.

In one or more embodiments, any one of mechanical sensors that measure mechanical properties such as inertia, force and displacement, physical sensors that measure physical properties such as magnetic field and other sensors that measures other properties relating to the driving of the automobile is preferably employed as one of the sensors 102.

More specifically, the sensors 102 may include one or more sensors selected from a group having an accelerometer for measuring one or more accelerations (e.g., x, y and z accelerations for a three-axis accelerometer); a gyroscope for measuring one or more angular velocities (e.g., roll, pitch and yaw axes angular velocities for a three-axis gyroscope); a speedometer for measuring (instantaneous) vehicle speed; a steering angle sensor for measuring a steering (wheel position) angle; a GPS (Global Positioning System) sensor for measuring latitude, longitude and/or height; a magnetometer such as a miniaturized microelectromechanical systems (MEMS) magnetometer for measuring azimuth and/or inclination; an accelerator pedal position sensor for measuring a depression amount and/or depression speed of an accelerator pedal; a throttle position sensor for measuring a position of a throttle valve; a brake pedal position sensor for measuring a depression amount and/or depression speed of a brake pedal.

Each of the aforementioned sensors may be embedded in any automotive electronics such as an automotive navigation system and a driving recorder. Note that examples of the driving recorder include a dashboard camera and an event data recorder (EDR). The dashboard camera is typically purchased from the automotive aftermarket and installed into an automobile after the sale of the automobile. The event data recorder (EDR) is typically installed into an automobile (e.g., in a restraint system control module) by a manufacturer before the sale of the automobile.

According to example embodiments, one or more sensors that are available to the driving recorder are preferably employed as the sensors 102. The usage of the sensor signal available to the driving recorder makes predictions possible at a low cost.

The input acquisition module 120 is configured to acquire the sensor signals transmitted from the sensors 102 to obtain sensor data, which is then used to perform the accident risk prediction based upon the anomaly detection model 114. The sensor data generated from the sensor signals is also called driving data in the described embodiments.

One driving data may include a series of vectors in time order (i.e., time series), in which each vector is recorded at a predetermined recording frequency. Each vector includes a plurality of recorded values selected from a group including accelerations of x, y and z axes, angular velocities of roll, pitch and yaw axes, a vehicle speed, a steering angle, latitude, longitude, height, an azimuth, a depression amount and a depression speed of an accelerator pedal, a position of a throttle valve, a depression amount and a depression speed of a brake pedal, and processed values obtained therefrom.

The processed values may be obtained by processing any one of the aforementioned recorded values. The ways of processing or conversion to obtain the process value may include, but is not limited to, differentiation, integration, computing difference, moving average, Fourier transform, etc. For example, examples of such a processed value include a vehicle velocity, azimuth difference and a jerk. The vehicle velocity is a time integration of the acceleration. The azimuth difference is difference in azimuth between two points of time and relates to velocity of the azimuth. The jerk is a rate of change of the acceleration for an axis (x, y, z-axis acceleration-based jerks that are time derivatives of the x, y, z-axis accelerations, respectively). Furthermore, aforementioned processing or conversion may be applied multiple times to the recorded value. For example, the jerk may be obtained as second time derivative of the vehicle speed (speed-based jerk). Acceleration in the azimuth may be obtained as second time derivative of azimuth. The processed value may be represented in a linear scale or log scale. Components of a plurality of axes may be treated separately as a vector, or may be treated together as magnitude or absolute value of the vector. Furthermore, each vector may include a plurality of recorded values and/or processed values obtained at different timings.

Note that two of the recorded and processed values may be related to and complementary to each other. For example, the jerk for an axis of travel direction of the automobile (a time derivative of the x-axis acceleration) relates to depression speeds of the brake and acceleration pedals. Although there are no restrictions to use in combination, the information of the depression speed of the acceleration and brake pedals may be omitted when the accelerations are available.

Note that image data, image-related information, audio data, audio-related information, radar data, radar-related information and geographic data, which require more computational resources (e.g., image processing, sound processing), extra devices (e.g., a camera, an image processing circuit, a microphone, an audio processing circuit, a radar device for sensing passengers and obstacles, etc.) and/or extra data (e.g., map data), may be excluded from the driving data as the input for the accident risk prediction module 140 even when such information is available in the dashboard camera, etc. However, there are no restrictions to prevent use of these data and results of analyzing aforementioned data in combination with a primary result of the accident risk prediction module 140 to derive a conclusive result.

The driving data store 112 is configured to store a collection of driving data that may be obtained from a variety of drivers. A plurality of driving data may have been collected from a plurality of automobiles actually running on roads. Also, the collection of the driving data may include driving data acquired when there is actually a traffic accident and driving data acquired when there is no traffic accident. Each driving data stored in the driving data store 112 includes an episode of driving performed by one driver, containing a sequence of vectors from the start of the driving (e.g., engine start, end of long term parking) to the end of the driving (e.g., engine stop, start of long term parking).

Each driving data may or may not have a correct label indicating whether there has actually been a traffic accident during the driving time or not. Each driving data may or may not have an attribute describing the detail of the traffic accident (e.g., an attribute indicating whether the traffic accident is a self-inflicted accident or not, an attribute indicating a type of the traffic accident, and the like).

The model training module 110 is configured to train an anomaly detection model using the driving data stored in the driving data store 112 to prepare the anomaly detection model 114. The anomaly detection model 114 generates an anomaly score for each point of time in a given input driving data. Note that correct label information indicating whether there is a traffic accident or not is not required to train the anomaly detection model 114. Thus, the anomaly detection model 114 is a kind of unsupervised model. In a particular embodiment, the training of the anomaly detection model 114 is conducted at a side of a vender of an apparatus implementing the system 100, as indicated by a dash line in FIG. 1. However, there are no restrictions to prevent training the model 114 at a side of a user of the apparatus.

The parameter tuning module 130 is configured to tune one or more parameters of the accident risk prediction using the driving data stored in the driving data store 112. If available, the correct label information indicating whether there is actually a traffic accident or not may be used to tune one of the parameters in a supervised manner. The tuning of one of the parameters may be performed in an unsupervised manner without the use of the correct label information. Also note that if possible one of the parameters may be set to an appropriate value roughly. Also note that tuning of the parameter may use one or more driving data acquired when there is actually a traffic accident. In example embodiments, the driving data used to tune the parameter may include both of driving data that is acquired when there is actually a traffic accident and driving data that is acquired when there is no traffic accident.

In a particular embodiment, to tune the parameter, a set of the driving data may be selected in a manner based on the attribute (e.g., self-inflicted accident, types of the traffic accident) associated to the driving data.

One or more training data may be generated from one driving data by cutting a time series of a predetermined length from the original driving data while shifting a time window. Note that the driving data acquired when there is actually a traffic accident would include a normal driving period (there is no accident) and an accident period (there is actually a traffic accident). The driving data used to tune the parameter may be or may not be same as one used to train the anomaly detection model 114.

The input acquisition module 120 is configured to pass the driving data obtained from the sensors 102 to the accident risk prediction module 140 sequentially, as an input for the accident risk prediction.

The accident risk prediction module 140 is configured to prepare the anomaly detection model 114 on a memory by reading content of the anomaly detection model 114 when the system 100 starts up. The accident risk prediction module 140 is configured to receive the input driving data from the input acquisition module 120 and to predict, at a time of prediction, a risk of a traffic accident involving a target automobile whose sensor data is used as the input, by using the anomaly detection model 114. More specifically, the accident risk prediction module 140 is configured to calculate an accident risk score based upon outputs of the anomaly detection model 114. The risk of the traffic accident is predicted in a manner based on the assumption that traffic accidents will occur as a result of consecutive abnormal or unusual driving behaviors during a period before the traffic accident but not momentary anomalies. Note that term 'abnormal driving behavior' or 'unusual driving behavior'
means a driving behavior deviating from the normal, ordinary or average. The examples of abnormal or unusual driving behaviors may include abrupt steering, sudden deceleration and the like.

In a particular embodiment, the prediction of the traffic accident may be conducted for input driving data as an ongoing episode. In this particular embodiment, the input driving data includes a sequence of vectors from a start of driving to the current time (the time of the prediction). Thus, the prediction of the risk of the traffic accident may be performed in real time. The real-time prediction is preferable since a driver would take an appropriate action to avoid the accident if the occurrence of the accident can be predicted during a pre-accident period. Note that the pre-accident period refers to a period before a certain timing that is considered sufficient for a driver to take an appropriate action so as to avoid the accident.

However, the prediction is not limited to executing in real time. In other particular embodiment, the prediction of the risk of the traffic accident may be conducted for input driving data as a complete episode including a sequence of vectors from a start of driving to an end of the driving or a certain time of detection. For example, the accident risk prediction may be used for driving diagnosis, in which a plurality of detection points are set on the given driving episode at an arbitrary timing and an accident risk score is calculated for each detection point (the time of the prediction) to identify potential driving risks or an average driving risk of a target individual through the driving. More detail about the calculation of the accident risk score and the usage of the accident risk score will be described later.

The output device 104 is configured to output a result of the accident risk prediction conducted by the accident risk prediction module 140. The result may indicate a presence of a risk of occurrence of a traffic accident when a predetermined detection condition related to the accident risk score is satisfied. The result may indicate an extent of a risk of occurrence of a traffic accident when one of predetermined detection conditions related to the accident risk score is satisfied. The predetermined detection condition may be set in relation to a statistic of accident risk scores calculated for a given set of driving data. More detail about the predetermined detection condition related to the accident risk score will be described later.

In a particular embodiment, the result of the accident risk prediction may be an alert or notification indicating that a potential risk of a traffic accident has been detected. The output device 104 may be any one of known output devices including, but is not limited to, a display, a speaker, alarm, a light indicator, etc. The alert or notification may be emitted in a form of sound, voice, text, image or light pattern, etc.

Figure 2:
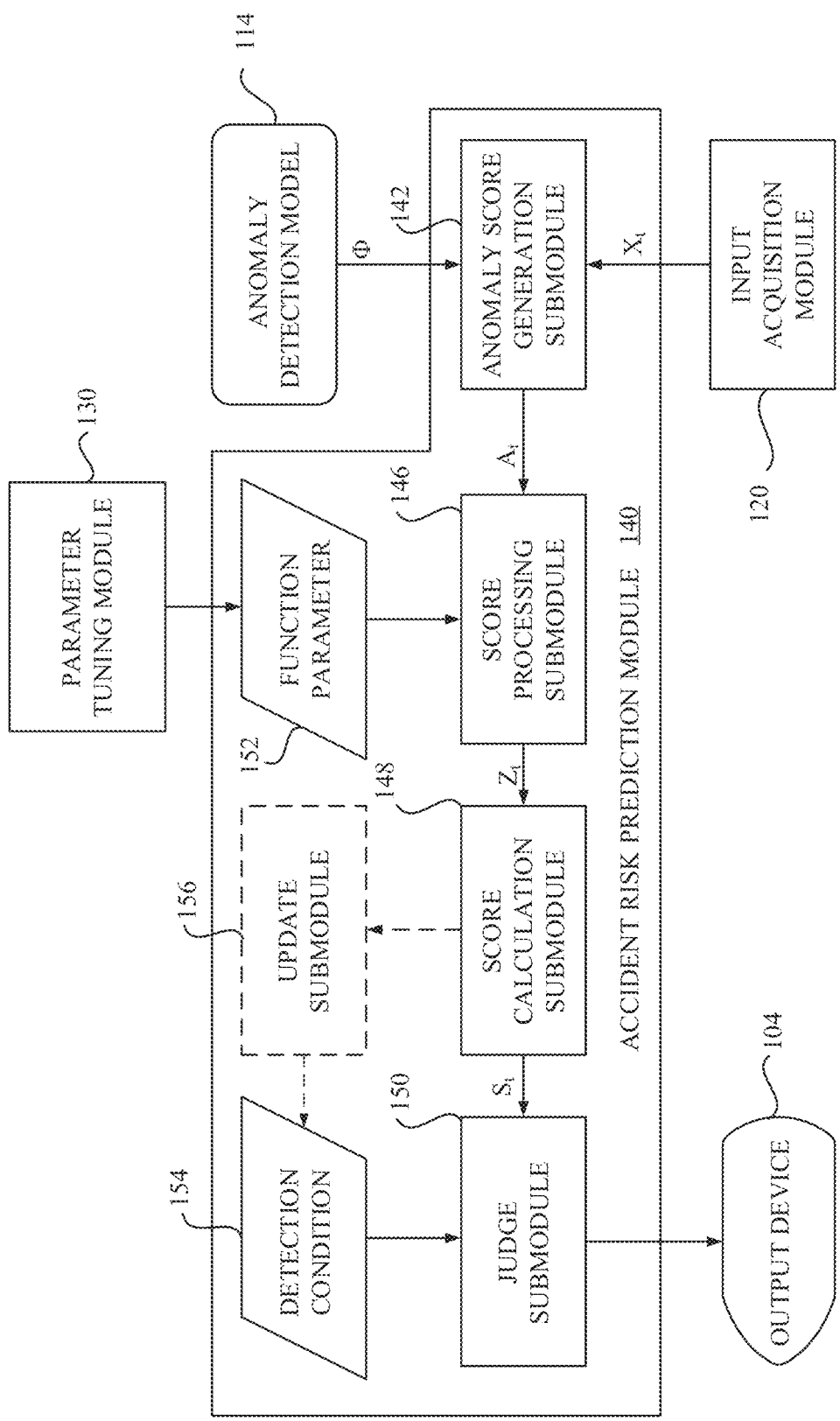
FIG. 2 illustrates a detailed block diagram of an accident risk prediction module in the accident risk prediction system according to the exemplary embodiment of the present invention.

With reference to FIG. 2, the way of the accident risk prediction is described in more detail. FIG. 2 illustrates a detailed block diagram of an accident risk prediction module 140 in the accident risk prediction system 100 shown in FIG. 1.

As shown in FIG. 2, the accident risk prediction module 140 includes an anomaly score generation submodule 142 for generating anomaly scores $A_t$ from the driving data (or the sensor data) $X_t$ based on the anomaly detection model 114; a score processing submodule 146 for processing the anomaly scores $A_t$ based on a function parameter 152 to generate processed anomaly scores $Z_t$; a score calculation submodule 148 for calculating an accident risk score $S_t$ from the processed anomaly scores 4 up to the time of the prediction; and a judge submodule 150 for judging whether the risk of the traffic accident exists or not based upon the accident risk score $S_t$ and a detection condition 154 to output a result by the output device 104.

The anomaly score generation submodule 142 is configured to receive the input driving data $X_t$, which is a sequence of vectors in time, from the input acquisition module 120. The anomaly score generation submodule 142 is configured to compute an anomaly score $A_t$ by inputting the input driving data $X_t$ into the anomaly detection model 114 to obtain a series of anomaly scores $\{A_1, \ldots, A_t\}$. The anomaly score $A_t$ is generated for each point of time t.

The score processing submodule 146 is configured to process each input anomaly score $A_t$ so as to limit an output value (hereinafter, an anomaly score after the processing is called a processed anomaly score) $Z_t$ below a predetermined value. Each processed anomaly score $Z_t$ is generated by using a threshold T with respect to the anomaly score $A_t$, which is provided in the function parameter 152 and may be tuned by the parameter tuning module 130 with the driving data stored in the driving data store 112. The function parameter 152 may be determined by a learning process such as gradient descent or an optimization process such as Bayesian optimization with the collection of the driving data stored in the driving data store 112.

More specifically, the score processing submodule 146 processes the anomaly score $A_t$ by an activation function. In a particular embodiment, an activation function that squeezes the processed anomaly score $Z_t$ into a range below the predetermined value when the input anomaly score $A_t$ exceeds the threshold T is preferably employed. Examples of such an activation function include a sigmoid function, a hyperbolic tangent function, a SQNL (Square nonlinearity) function, an arctangent function, an inverse hyperbolic sine function, a binary or bipolar saturating linear function, to name but a few. For example, the sigmoid function squeezes an input into a range between 0 and 1. In the embodiment where the sigmoid function is employed, the score processing submodule 146 processes the anomaly score $A_t$ so as to limit the processed anomaly score $Z_t$ below 1.

In this particular embodiment where the activation function squeezes the processed anomaly score into the predetermined range, the activation function may have additional parameter to control a shape (more specifically steepness) of the activation function.

In another particular embodiment, the activation function may be a step function. The examples of such a step function may include a binary hard limiter (or Heaviside function) and a bipolar hard-limiter. The hard limiter outputs a predetermined upper limit value (e.g., 1) as the processed anomaly score $Z_t$ if the input anomaly score $A_t$ exceeds the threshold T and a predetermined lower limit value (e.g., 0, −1) otherwise. The binary hard-limiter or Heaviside function limits the input to either 1 or 0 depending on whether the input exceeds the threshold T or not.

Among various activation functions, an activation function that is continuously differentiable is preferably employed since the use of the continuously differentiable activation function allows the parameter tuning by the learning process (e.g., gradient descent) more efficiently than the Bayesian optimization, which is applicable to non-differentiable type function. Note that the sigmoid function is continuously differentiable.

The score calculation submodule 148 is configured to calculate an accident risk score $S_t$ at the time of the prediction t by using a series of processed anomaly scores up to the time of the prediction. The accident risk score $S_t$ is calculated by adding the processed anomaly scores up to the time of the prediction using a discount factor, which is provided in the function parameter 152 and may be tuned by the parameter tuning module 130 with the driving data stored in the driving data store 112 or roughly determined.

In a particular embodiment, the accident risk score $S_t$ is a weighted sum of the processed anomaly scores with respective weights. In this particular embodiment, the discount factor determines how much the influence of the processed anomaly score $Z_t$ is attenuated as a function of temporal distance from the time of the prediction. The weights become smaller based on the discount factor as the temporal distance from the time of the prediction increases. The discount factor may have an exponential relationship with temporal distance so that an abnormal or unusual driving behavior that is far from the time of the prediction has a large discount, which means forgetting or having little influence.

In other particular embodiment, the accident risk score $S_t$ is a sum of the processed anomaly scores within a predetermined period based on the discount factor. In this particular embodiment, the discount factor determines a range of temporal distance over which the sum is calculated. When considered as a weighted sum, the weight is 1 in the range of the temporal distance determined by the discount factor and becomes 0 outside the range. In this case, the accident risk score $S_t$ is equivalent to simply a count or frequency of abnormal or unusual driving behaviors within the predetermined range. An event where the anomaly score $A_t$ exceeds the threshold T is detected as the abnormal or unusual driving behavior.

The judge submodule 150 is configured to judge whether the accident risk score $S_t$ indicates a presence of a risk of occurring a traffic accident involving the target automobile or not to generate a result. In the described embodiment, the judgement is performed in a manner based upon the detection condition 154. The detection condition 154 may include a score threshold $S_{TH}$ with respect to the accident risk score $S_t$. The score threshold $S_{TH}$ may be determined using a collection of accident risk scores calculated up to the moment (calculated for the past driving data within a certain period) and/or accident risk scores calculated for the driving data stored in the driving data store 112.

In one or more embodiments, the score threshold $S_{TH}$ may be set in relation to a statistic of the past accident risk scores calculated for the currently available driving data. The statistic of the accident risk score may be a maximum, mean, median, n-quantile (e.g. 0.75 quantile), etc. In a particular embodiment, the score threshold $S_{TH}$ may be set to the maximum of the accident risk scores (or a value obtained by multiplying the maximum by a predetermined rate) that are observed in the currently available driving data. Calculation of the maximum of the past accident risk scores does not require storing of all the past driving data and/or the past accident risk score generated therefrom. Simply preparing a memory region where the maximum value is stored is sufficient.

The score threshold $S_{TH}$ may be adjusted in light of a purpose of an application, in reference to a distribution of the accident risk scores calculated for the currently available driving data. The score threshold $S_{TH}$ may be set lower in applications where a priority is given to alerting or notification over accuracy. For example, even if alerts or notifications occur frequently, such a frequently alerting would help prevent traffic accidents. In contrast, the score threshold $S_{TH}$ may be set higher in applications where a priority is given to accuracy over alerting or notification. In a particular embodiment, the score threshold $S_{TH}$ may be adjusted to keep a predetermined false positive rate.

In an example embodiment, the judge submodule 150 is described to perform a simple binary classification using the score threshold $S_{TH}$. Such a simple mechanism to obtain the result is preferred for real-time detection, especially in in-vehicle devices (i.e., edge device) that have generally limited computational resources. In other embodiments, the judge submodule 150 may determine the extent of the traffic accident risk by using a plurality of score thresholds, for instance.

However, in other embodiments where computational resource constraints are relatively more relaxed in comparison with aforementioned case and correct labels representing whether there is actually a traffic accident or not for the driving data are available, not only a simple binary classification but also more sophisticated classification models, including artificial neural network and support vector machines that use the accident risk score as a input feature for the subsequent classification model, are also contemplated.

As shown in FIG. 2, the accident risk prediction module 140 may further include an update submodule 156 for updating the detection condition 154. The update submodule 156 is configured to update the detection condition 154 using the accident risk scores calculated up to the moment from the currently available driving data, in response to an update condition being satisfied. The update condition may include a setting value that designates whether to perform an online update or not and optionally a setting value that designates a frequency or a period of the update. For example, a target driver (a user of the target automobile) is requested to perform the driving of the automobile for at least a predetermined preparation period (e.g., 1 week) and the score threshold $S_{TH}$ may be determined during this preparation period.

Figure 3:
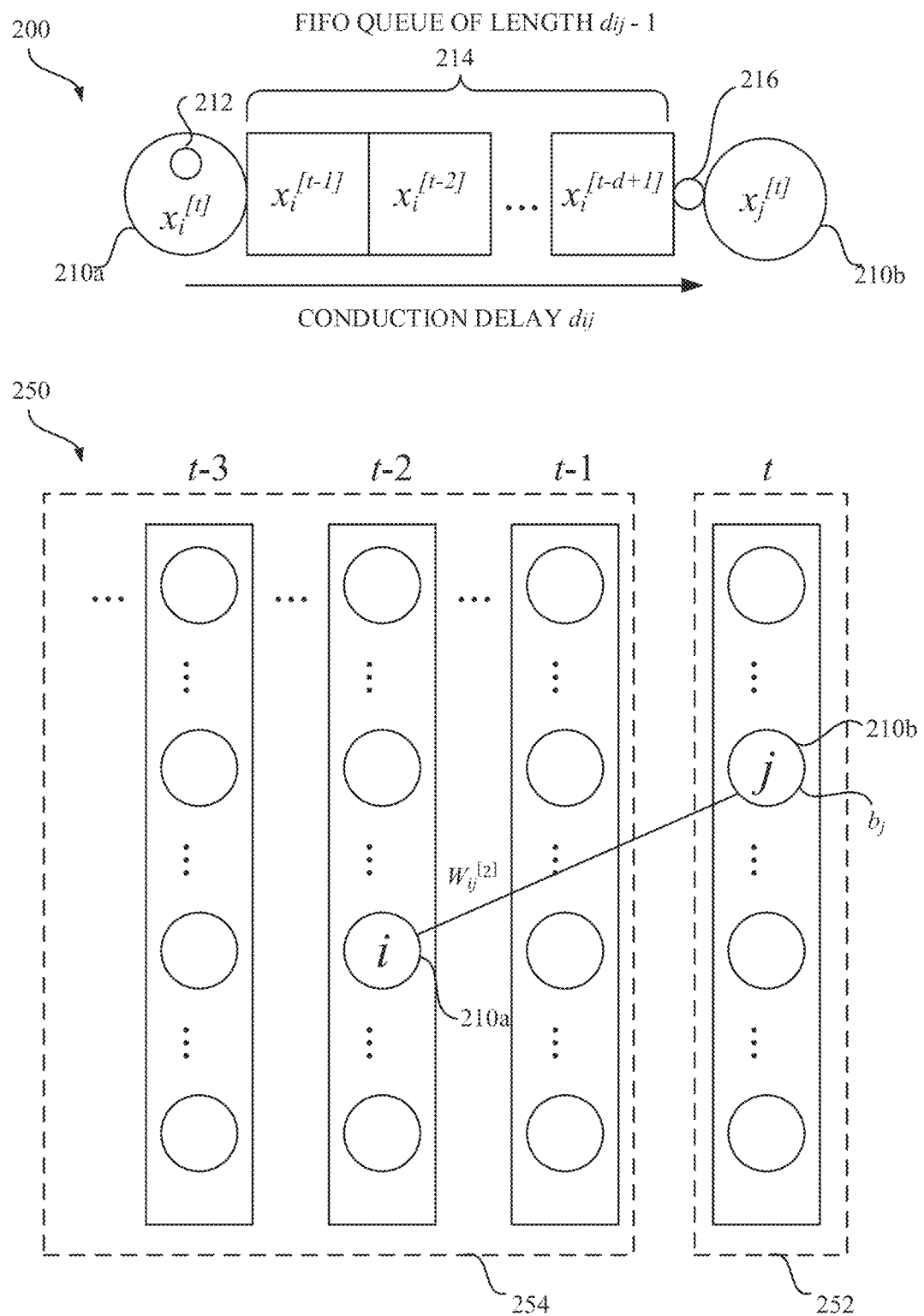
FIG. 3 illustrates a schematic of architecture of an anomaly detection model used to predict a risk of a traffic accident according to one or more embodiments of the present invention.

With reference to FIG. 3, an architecture of an anomaly detection model used to predict the risk of the traffic accident according to one or more embodiments of the present invention is described. In a preferable embodiment, the anomaly detection model 114 is a time series model, and preferably has architecture of a dynamic Boltzmann machine (DyBM). FIG. 3 shows architecture that is based on the dynamic Boltzmann machine (DyBM).

A dynamic Boltzmann machine or DyBM is a model of a spiking neural network, and its learning rule of maximizing the log-likelihood of given time-series exhibits properties of spike-timing dependent plasticity (STDP), which have been postulated and experimentally confirmed in the field of the neuroscience as a learning rule that refines the Hebbian rule.

The DyBM includes a network of a set of neurons. A pair of neurons is connected through a synapse. There is a pre- and post-synaptic relationship between connected neurons. Note that any neuron may be called a pre-synaptic neuron and a post-synaptic neuron depending on the synapse under consideration.

The diagram 200 shows a connection from a pre-synaptic neuron 210a (i) to a post-synaptic neuron 210b (j) in the DyBM. The pre-synaptic neuron 210a (i) is connected to the post-synaptic neuron 210b (j) via a FIFO (First-In-First-Out) queue 214. The FIFO queue 214 stores the values of the pre-synaptic neuron 210a (i) for the last $d_{ij}-1$ units of time. Each stored value is pushed one position toward the head of the FIFO queue 214 when the time is incremented by one unit. The value of the pre-synaptic neuron 210a (i) is thus given to the post-synaptic neuron 210 after the conduction delay ($d_{ij}$). Note that the conduction delay ($d_{ij}$) is sampled independently and different for each connection between the neurons. Alternatively, the conduction delay ($d_{ij}$) may be common over the plurality of connections between the neurons.

Each neuron 210 has a first memory unit 212 for storing neural eligibility traces, which summarize activities of the neuron in the past. Also, a second memory unit 216 is associated with a synapse between the pre-synaptic neuron 210a (i) and the post-synaptic neuron 210b (j). The second memory unit 216 is used for storing a synaptic eligibility trace that summarizes the spikes arrived at the synapse via the FIFO queue 214 from the pre-synaptic neuron 210a (i).

The DyBM aggregates information about the spikes in the past into the neural eligibility traces and the synaptic eligibility trace, which are stored in the memory units 212, 216. The value of the neural eligibility trace increases when an associated neuron spikes and decreases otherwise. The value of a synaptic eligibility trace increases when the spike from a pre-synaptic neuron reaches a post-synaptic neuron and decreases otherwise.

In the DyBM, variables may include a value of the neuron j at time t, $x_j^{[t]}$, the neural eligibility traces stored in the first memory unit 212 and the synaptic eligibility traces stored in the second memory unit 216, which are updated when the DyBM is trained or is generating a sequence.

The diagram 250 describes a schematic of the DyBM unfolded in time. As shown in the diagram 250 of FIG. 3, the DyBM may be defined by using a finite dynamic Boltzmann machines having T-layers as a limit where the number of the layers T becomes infinite (T->∞). The finite dynamic Boltzmann machines has a T−1 layers of input units 252 corresponding to the past time series and one layer of output units 252 corresponding to a next pattern. The dynamic Boltzmann machines may not have a hidden unit or may have a hidden unit.

The DyBM has learnable parameters that are updated during training, in addition to structural parameters that are fixed and are not updated when the DyBM is trained or is generating a sequence and the aforementioned variables.

The structural parameters may include the number of the neurons, the number of the neural eligibility traces for each neuron, the number of the synaptic eligibility traces for each pair of the neurons, the delay from the pre-synaptic neuron to post synaptic neuron, the decay rate of each neural eligibility trance, the decay rate of each synaptic eligibility traces, etc.

The learnable parameters of the DyBM are a bias $b_j$ given to each neuron j and a weight $w_{ij}^{[\delta]}$, which denotes the weight between the i-th unit at time $-\delta$ and the j-th unit at time 0. This weight may be divided into two types of weights including a LTP (Long Term Potentiation) weight, in which the synapse is strengthened if the spike of a pre-synaptic neuron precedes the spike of a post-synaptic neuron, and a LDP (Long Term Depression) weight, in which the synapse is weakened if the temporal order is reversed.

Each neuron originally takes a binary value (0 or 1) that the neuron takes the value 1 (i.e., it spikes) at any moment depends on the previous values of the variable of the neurons as well as the values of the learnable parameters of the DyBM. However, the DyBM may be extended to take a real value by using Gaussian unit (i.e., Gaussian DyBM).

Since the DyBM predicts next values of time-series when a past part of time series is given, the anomaly score may be calculated as an error of the predicted next values from actually observed values such as a RMSE (Root Mean Square Error), MAE (Mean Absolute Error), MSE (Mean Squared Error), etc.

In order to adjust the learnable parameters in the DyBM, an online gradient ascent method may be used to maximize the likelihood of given sequential patterns. The learnable parameters are updated only on the basis of the information that is available at the associated synapse or neuron, and there is no need to store the whole sequence for learning via backpropagation through time as required in the learning of the RNN (Recurrent Neural Network).

The dynamic Boltzmann machine is preferable since it is lightweight in terms of both of training and inference. Thus, even when computational resources are practically limited in a case such that an in-vehicle computer system, the anomaly detection model 114 can be running on the system in real time.

Note that the architecture of the anomaly detection model is not limited to the dynamic Boltzmann machine specifically described above. Other anomaly detection model such as RNNs (Recurrent Neural Networks; including LSTM (Long short-term memory)) based model may also be employed in a light of computational resource constraints. The time series models that can handle temporal context are preferably employed. However, in a further other embodiment, non-time series type models such as a proximity-based anomaly detection model using sparse structure learning and a linear regression-based model may also be used as the anomaly detection model.

In particular embodiments, each of the modules 110, 120, 130 and 140 and the model 114 described in FIG. 1 and each of submodules 142, 146, 148, 150 and 156 of the accident risk prediction module 140 shown in FIG. 2 may be implemented as, without limitation, a software module including instructions and/or data structures in conjunction with hardware components such as a processor, a memory, etc.; a hardware module including electronic circuitry; or a combination thereof. These modules 110, 120, 130 and 140, the model 114 and these submodules 142, 146, 148, 150 and 156 described in FIG. 1 and FIG. 2 may be implemented on a single computer system such as a personal computer, a server machine and a microcontroller of an apparatus such as an automobile and an automotive equipment, or over a plurality of devices such as a client server system, an edge computing system, a computer cluster in a distributed manner.

Hereinafter, referring to a flowchart shown in FIG. 4 together with time series schematically shown in FIG. 5, a process for predicting a risk of a traffic accident according to an exemplary embodiment of the present invention is described in more detailed.

Figure 4:
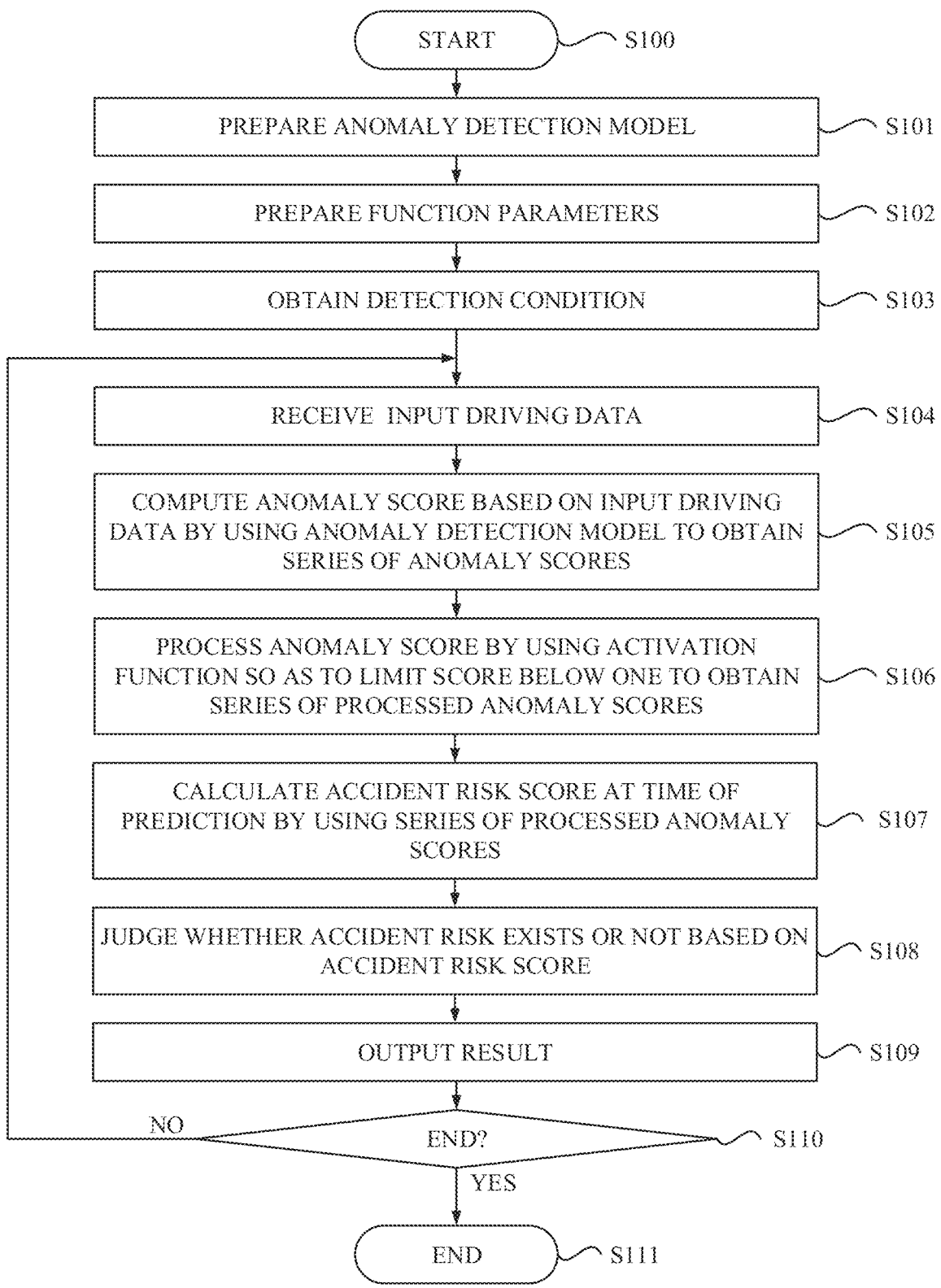
FIG. 4 is a flowchart depicting a process for predicting a risk of a traffic accident involving a target automobile according to an exemplary embodiment of the present invention.

FIG. 4 shows a flowchart depicting a process for predicting a risk of a traffic accident involving a target automobile whose sensor data is used as an input for the anomaly detection model 114. Note that the process shown in FIG. 4 may be performed by processing circuitry that implements at least the accident risk prediction module 140 shown in FIG. 1 and its submodules shown in FIG. 2. The process shown in FIG. 4 may begin at step S100 in response to the system 100 being started up.

At step S101, the processing circuitry may prepare an anomaly detection model 114. The anomaly detection model 114 may be prepared by reading contents (the learnable parameters and the structural parameters) of the anomaly detection model 114 that has already been trained with a collection of driving data stored in the driving data store 112. Alternatively, the anomaly detection model 114 may be prepared by training an anomaly detection model with the collection stored in the driving data store 112.

At step S102, the processing circuitry may prepare a function parameter 152 used for processing the anomaly scores. The processing circuitry may prepare the function parameter 152 by reading a result of the parameter tuning process that has been performed, in advance, with a collection of driving data stored in the driving data store 112. A plurality of driving data may be used to tune the function parameter 152. In the described embodiment, the function parameter 152 includes a threshold T with respect to the anomaly score and the discount factor. Alternatively, the function parameter 152 may be tuned by using the collection of the driving data stored in the driving data store 112. Note that the threshold T may be set in a supervised manner or an unsupervised manner (e.g., statistics). Also, the discount factor may be set in a supervised manner or an unsupervised manner. Alternatively, the discount factor may be roughly determined since the impact of the discount factor on the performance is less than the threshold T.

At step S103, the processing circuitry may obtain a detection condition 154 used for detecting a risk of a traffic accident. The detection condition 154 may be obtained by reading a default value or an updated value. In the described embodiment, the detection condition 154 may include a score threshold $S_{TH}$ with respect to the accident risk score $S_t$. The score threshold $S_{TH}$ may be calculated using the collection of the past driving data, as follows;

$$S_{TH} = S_{max} \times \rho,$$

where $S_{max}$ denotes the maximum over the accident risk scores calculated for the past driving data and the $\rho$ represents rate to multiply (e.g., 0.9).

At step S104, the processing circuitry may receive input driving data $X_t$. The input driving data $X_t$ may be generated by the input acquisition module 120 that acquires sensor signals of the sensors 102. Alternatively, the input driving data $X_t$ may be received from a driving recorder or an automobile through a network (e.g., a mobile network, internet and the like). Alternatively, the input driving data $X_t$ may be received by reading the input driving data from a storage medium that stores the input driving data.

At step S105, the processing circuitry may compute an anomaly score $A_t$ based upon the input driving data $X_t$ by using the anomaly detection model 114 to obtain a series of anomaly scores $\{A_1, \ldots, A_t\}$. The anomaly score $A_t$ for each point of time t may be calculated by one of the following equations:

$$A_t = \sqrt{\frac{1}{m}\sum_{j=1}^{m}(\phi^j(X_t) - X_t^j)^2} \quad \text{(in the case of RMSE), or}$$

$$A_t = \frac{1}{m}\sum_{j=1}^{m}|\phi^j(X_t) - X_t^j| \quad \text{(in the case of MAE),}$$

where $\Phi$ denotes the anomaly detection model, $\Phi^j$ represents the j-th component of the primary output of the anomaly detection model, $X_t^j$ denotes the j-th component of the vector of the sensor data $X_t$, and m denotes the dimension of the vector of the sensor data $X_t$.

Figure 5:
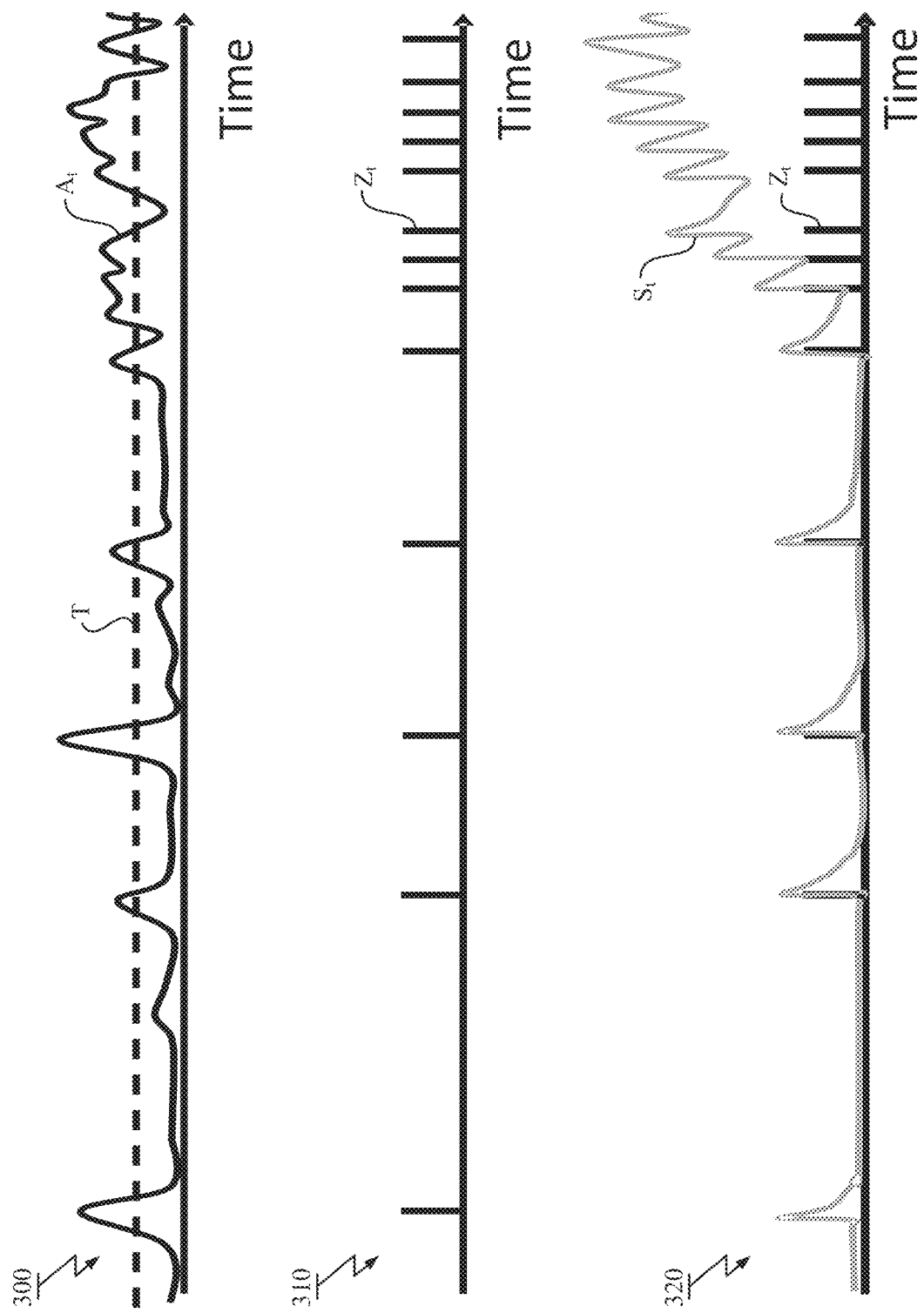
FIG. 5 depicts schematics of time series of pure and processed anomaly scores and a time series of accident risk scores obtained for input driving data according to the exemplary embodiment of the present invention.

FIG. 5 depicts a schematic of a time series of pure anomaly scores 300 obtained for input driving data. As shown in FIG. 5, the time series of the pure anomaly scores 300 shows the variation over time. Note that the pure anomaly score presents a value according to the magnitude of the anomaly.

Referring back to FIG. 4, at step S106, the processing circuitry may process the anomaly scores $A_t$ by using an activation function so as to limit the score below 1 to obtain a series of processed anomaly score $\{Z_1, \ldots Z_t\}$. The processed anomaly score $Z_t$ for each point of time t may be calculated by the following equation:

$$Z_t = \frac{1}{(1 + \exp(T - A_t))},$$

where T denote the threshold to detect an abnormal or unusual driving behavior. The aforementioned equation is an example using a sigmoid function. In other embodiments, there is an additional parameter $\alpha$ to control the shape of the sigmoid function as follows:

$$Z_t = \frac{1}{(1 + \exp(\alpha T - \alpha A_t))}, \text{ or}$$

$$Z_t = \frac{1}{(1 + \exp(T - A_t)^\alpha)}.$$

In the aforementioned sigmoid functions with the parameter $\alpha$, the parameter $\alpha$ defines the steepness of the transition between the lower and upper limit values (0, 1). Furthermore, in a particular embodiment where the activation function is a Heaviside function, the processed anomaly score $Z_t$ for each point of time t may be calculated by the following equation:

$$Z_t = g(T - A_t) = \begin{cases} 1, & \text{if } T - A_t > 0 \\ 0, & \text{otherwise} \end{cases}.$$

FIG. 5 depicts also a schematic of a time series of processed anomaly scores 310 obtained for input driving data. As shown in FIG. 5, in the time series of the processed anomaly scores 310, a spike appears at each timing corresponding to an abnormal or unusual driving behavior, which is detected as an event where the anomaly score $A_t$ exceeds the threshold T as illustrated by a dash line in FIG. 5. Note that the detailed magnitude information is ignored since the pure anomaly score $A_t$ is squeezed into a specific range (e.g., interval [0, 1]). There is merely the information indicating whether the threshold is exceeded or not.

Limiting the processed anomaly score $Z_t$ so as not to exceed the predetermined value, i.e. ignoring detailed magnitude of the anomaly score $A_t$ above the threshold T, allows the evaluation of the consecutive abnormal or unusual driving behaviors appropriately.

Note that in the described embodiment, the threshold T is given with respect to the anomaly score $A_t$. However, in other embodiment, a threshold may be given for each component (variable) of the output of the anomaly detection model 114 as follows:

$$Z_t = \frac{1}{\left(1 + \exp\left(\frac{1}{m}\sum_{j=1}^{m}(T^j - |\phi^j(X_i) - X_i^j|)\right)\right)},$$

where $T^j$ denotes a threshold for the j-th component.

Also note that though the spikes observed in the time series of the processed anomaly scores $Z_t$ are illustrated in FIG. 5 to have a unit width regardless of whether the duration of the event where the threshold is exceeded (or the abnormal or unusual driving behavior), for the purpose of the illustration, however, each spike typically has a width according the duration of the abnormal or unusual driving behavior. However, in other embodiments, there may be a post-processing to make the time series of the processed anomaly scores have spikes with a unit width regardless of whether the duration.

Referring back to FIG. 4, at step S107, the processing circuitry may calculate the accident risk score $S_t$ based on the processed anomaly scores up to the time of the prediction ($Z_i|0<i\leq t$). In the described embodiment, the accident risk score $S_t$ may be calculated by the following equation:

$$S_t = \sum_{0<i\leq t} \lambda^{t-i} Z_i,$$

where $\lambda$ ($0<\lambda<1$) represents a temporal discount factor that gives a weight for each point of time i. As expressed in the aforementioned equation, the accident risk score $S_t$ is defined as a weighted sum of the processed anomaly scores $\{Z_1, \ldots, Z_t\}$ with weights. The discount factor $\lambda$ determines how much the influence of the processed anomaly score is attenuated as a function of the temporal distance from the time of the prediction (t−i). The weights become smaller based on the discount factor $\lambda$, as the temporal distance from the time of the prediction (t−i) increases. The accident risk score evaluates the consecutive abnormal or unusual driving behaviors of the driver with consideration of the temporal discount.

Note that the aforementioned weighted sum may also be calculated by using a previous value of the sum $S_{t-1}$ and a current processed anomaly score $Z_t$ as follows:

$$S_t = \lambda S_{t-1} + Z_t$$

Thus, there is no need to prepare an array for storing the processed anomaly scores for a predetermined period $\{Z_1, \ldots Z_{t-1}\}$. The weight for the abnormal or unusual driving behavior that is far from the time of the prediction ($i \ll t$) asymptotically approaches zero for $0<\lambda<1$. Using the aforementioned weighted sum makes the score calculation efficient.

FIG. 5 depicts further a schematic of a time series of accident risk scores 320 obtained for the input driving data. As shown in FIG. 5, the accident risk score $S_t$ decays to zero over time when the frequency of the abnormal or unusual driving behaviors is relatively low. On the other hand, the accident risk scores $S_t$ piles up when the frequency of the abnormal or unusual driving behaviors becomes high such that the abnormal or unusual driving behaviors occurs one after the other before the score is fully attenuated.

In further other particular embodiment, the accident risk score $S_t$ is defined as a sum of the processed anomaly scores within a predetermined period that is based on the discount factor. In this particular embodiment, the accident risk score $S_t$ may be calculated by the following equation:

$$S_t = \sum_{t-k<i\leq t} Z_i,$$

where k denotes a discount factor that determines a range of temporal distance over which the sum is calculated. In this case, the accident risk score $S_t$ is equivalent to simply a count of abnormal or unusual driving behaviors within the predetermined range.

Referring back to FIG. 4, at step S108, the processing circuitry may judge whether there is a risk of a traffic accident or not in a manner based on the accident risk score $S_t$ computed for the given input driving data up to the time of the detection $\{X_1, \ldots X_t\}$. The judgement may be performed as follows:

$$\text{There is a risk} = \begin{cases} \text{True,} & \text{if } S_t > S_{TH} \\ \text{False,} & \text{if } S_t \le S_{TH} \end{cases}.$$

At step S109, the processing circuitry may output a result. The result indicates a presence of a risk of a traffic accident when the detection condition 154 is satisfied. The result also indicates absence of any risk of a traffic accident when the detection condition 154 is not satisfied.

At step S110, the processing circuitry may determine whether the process ends or not. If the processing circuitry determines that the process is not ended in step S110, the process may loop back to step S104 for a subsequent part of the input driving data. On the other hand, if the processing circuitry determines that the process is terminated in step S110, the process may proceed to step S111 to end the process.

Although not shown in FIG. 4, after the judgement at step S108, the processing circuitry may determine whether it is necessary to update the detection condition 154 (including the score threshold $S_{TH}$) or not based on a update condition. If the update is required, the processing circuitry may update the detection condition 154. In a preferable embodiment, there is a memory region where the maximum value over the observed accident risk scores $S_{max}$ is stored. If the maximum value $S_{max}$ stored in the memory region is lower than the currently calculated accident risk score $S_t$, the memory region may be updated by simply replacing the value by this new value $S_t$.

Figure 6:
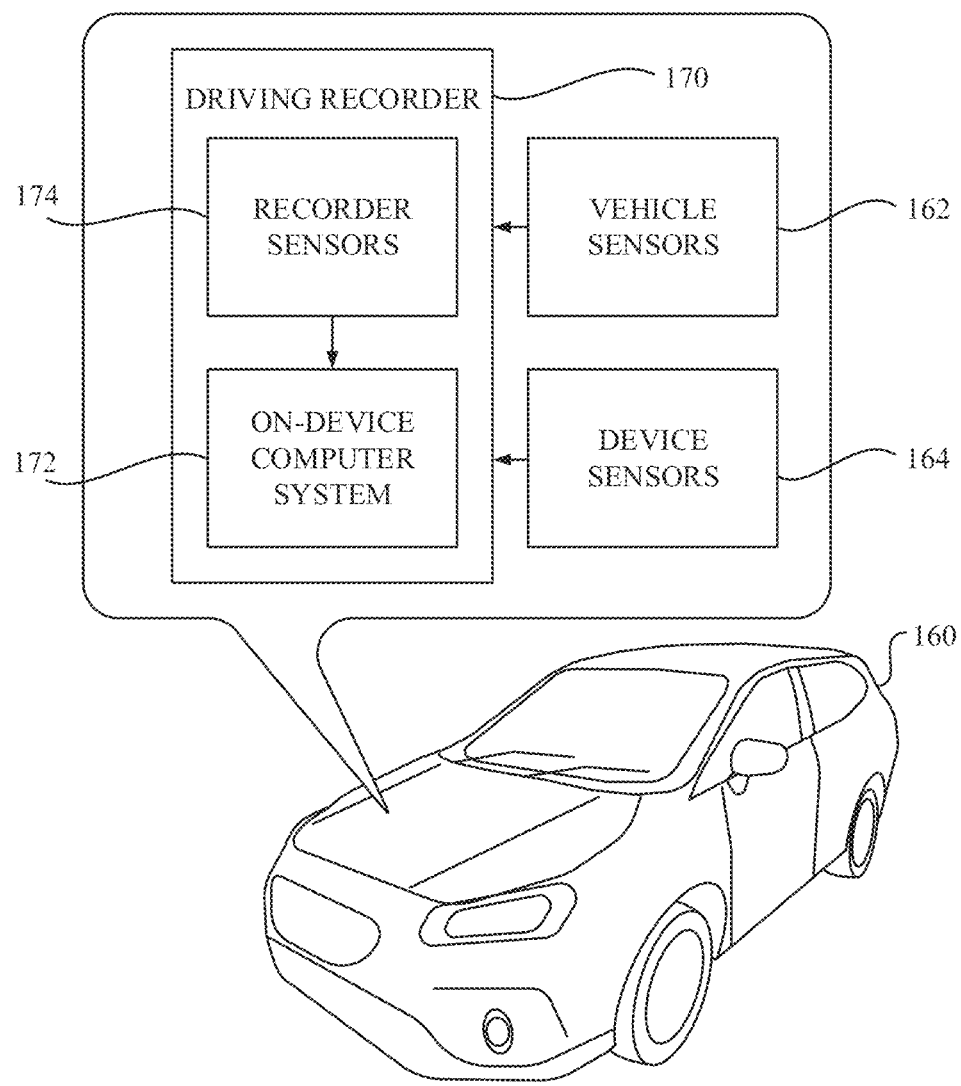
FIG. 6 describes a schematic of an automobile where an accident risk prediction system is implemented according to a particular embodiment of the present invention.

With reference to FIG. 6, a schematic of an automobile, in which the accident risk prediction system 100 is implemented, according to one or more particular embodiments of the present invention are described.

FIG. 6 describes a schematic of an automobile 160, in which the accident risk prediction system 100 is implemented. The automobile 160 is equipped with a driving recorder 170; vehicle sensors 162 and device sensors 164. The vehicle sensors 162 may include any sensors equipped in the automobile 160 in relation to its vehicle control system. The device sensors 164 may include any sensors that are implemented in automotive equipment such as a car navigation system, ETC (Electronic toll collection) unit, etc., which are equipped with the automobile 160.

The driving recorder 170 may include recorder sensors 174, including any sensors implemented in the driving recorder 170 itself and an on-device computer system 172 that implements at least the model 114 and the modules 120 and 140 shown in FIG. 1.

The driving recorder 170 may acquire sensor signals originating from the recorder sensors 174, the vehicle sensors 162 and the device sensors 164. The sensors 102 shown in FIG. 1 may include any one of the recorder sensors 174, the vehicle sensors 162 and the device sensors 164.

In the particular embodiment shown in FIG. 6, major components of the accident risk prediction system 100 except for the model training module 110, the driving data store 112 and the parameter tuning module 130 may be implemented in the automobile 160, as indicated by dashed line in FIG. 1. The model training module 110, the driving data store 112 and the parameter tuning module 130 may be implemented in a central computational system at a side of vender.

Although the on-device computer system 172 that implements the major components of the accident risk prediction system 100 is described with reference to FIG. 6, however, computer systems for predicting a risk of a traffic accident is not limited to the aforementioned on-device computer system 172 of the driving recorder 170. The computer system is preferably an in-vehicle computer system of a vehicle control system of the automobile 160, an on-device computer system of other automotive equipment such as car navigation system and infotainment system, and a mobile computer system such as a smartphone and tablet computer that is brought into the automobile 160, to name but a few. The computer system may also be a general purpose computing system that receives sensor data of the automobile 160.

Hereinabove, the embodiments where merely one type of an anomaly detection model are used has been described. Hereinafter, with reference to FIG. 7, a computer system for predicting a risk of a traffic accident according to other exemplary embodiment of the present invention where general and driver-specific anomaly detection models are used to predict a risk of a traffic accident is described.

Figure 7:
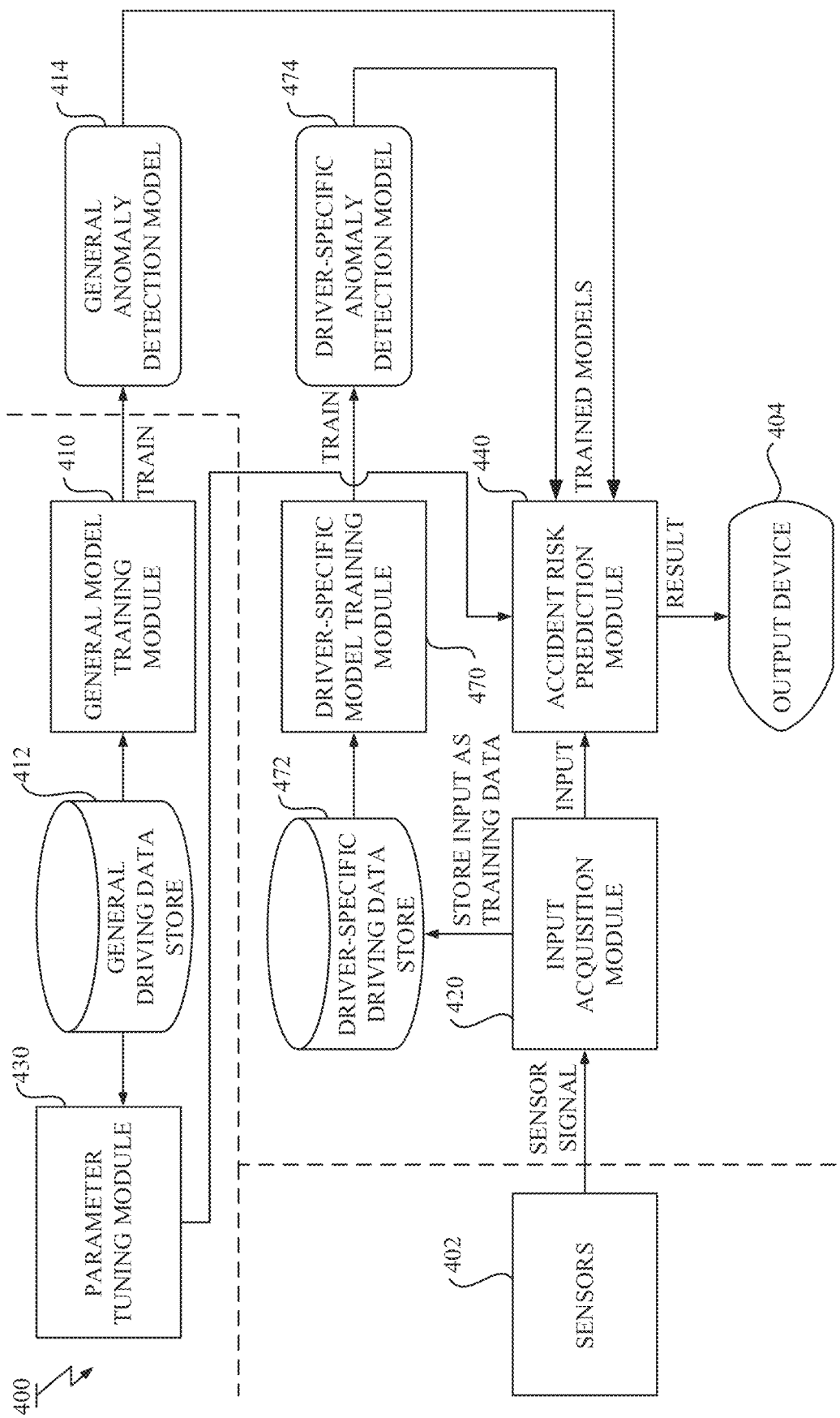
FIG. 7 illustrates a block diagram of an accident risk prediction system for predicting a risk of a traffic accident by using general and driver-specific anomaly detection models according to other exemplary embodiment of the present invention.

Referring to FIG. 7, a block diagram of an accident risk prediction system 400 is described. As shown in FIG. 7, the accident risk prediction system 400 includes sensors 402; an input acquisition module 420; an accident risk prediction module 440 for performing accident risk prediction based on a plurality of types of anomaly detection models; and an output device 404.

The accident risk prediction system 400 may include also a general model training module 410 for training a general anomaly detection model 414; a general driving data store 412 for storing a collection of driving data that may be obtained from a variety of drivers; and a parameter tuning module 430 for tuning the parameter for the accident risk prediction by using the collection stored in the general driving data store 412.

In the embodiment shown in FIG. 7, the accident risk prediction system 400 further includes a driver-specific model training module 470 for training a driver-specific anomaly detection model 474; and a driver-specific driving data store 472 for storing a collection of driving data obtained from a driver (may be a single driver) in local environment, which is used for training the driver-specific anomaly detection model 474.

As similar to the embodiment shown in FIG. 1, the general model training module 410 is configured to train an anomaly detection model to prepare the general anomaly detection model 414. The general anomaly detection model 414 is an anomaly detection model for generating a general anomaly score for each point of time. The general anomaly detection model 414 is said to be "general" in a sense that it learns average characteristics of the variety of the drivers.

The accident risk prediction system 400 operates in a plurality of phases, including a training phase and an inference phase. In the training phase, the input acquisition module 420 is configured to acquire the sensor signals and store the driving data into the driver-specific driving data store 472 while a target driver in local environment (an owner or user of the automobile, their family such as a spouse, a child and a parent, or their employee, etc., and may be one driver) drives the automobile. The driver-specific driving data store 472 is configured to store the collection of the plurality of the driving data related to the driving of the target driver or driver-specific driving data.

In the described embodiment, the target driver is requested to perform the driving of the automobile successively (not meaning continuous driving without stopping) for at least a predetermined period or distance. Each driving data stored in the driver-specific driving data store 472 is also an episode of driving performed by the target driver, containing a sequence of vectors from a start of the driving to an end of the driving, as similar to the driving data stored in the general anomaly detection model 414.

The driver-specific model training module 470 trains an anomaly detection model with the driver specific driving data stored in the driver-specific driving data store 472 to prepare the driver-specific anomaly detection model 474. The driver-specific anomaly detection model 474 is an anomaly detection model for generating a driver-specific anomaly score for each point of time. The driver-specific model training module 470 is said to be "specific" in a sense that it learns characteristics of mainly the target driver instead of the variety of the drivers.

The training of the driver-specific anomaly detection model 474 may be performed after the sufficient amount of driving data has been accumulated in the driver-specific driving data store 472 (offline or batch learning). Alternatively, the training of the driver-specific anomaly detection model 474 may be performed each time the driving data is available (online learning). It is preferable that the architecture of the general and driver-specific anomaly detection models 414, 474 be the same since reactivity of the models for the same input may differ depending on the architecture of the models. Although it is not required in example embodiments, it is preferable that the number of the nodes in the anomaly detection model be the same.

Also during the training period of the driver-specific anomaly detection model 474 or a certain period after the training period, the detection condition including the score threshold $S_{TH}$ may be tuned by using collected driving data.

In the inference phase, the input acquisition module 420 is configured to pass the driving data that is obtained from the sensors 402 to the accident risk prediction module 440 sequentially, as an input for the accident risk prediction.

The accident risk prediction module 140 prepares the general and driver-specific anomaly detection model 414, 474 on a memory. The accident risk prediction module 440 receives input driving data from the input acquisition module 420 and to predict a traffic accident risk using the plurality of the anomaly detection models 414, 474.

In the described embodiment, the accident risk prediction module 140 is configured to calculate an accident risk score $S_t$ based upon the plurality of the anomaly detection models 414, 434. In calculating the accident risk score $S_t$, the accident risk prediction module 140 computes overall anomaly score by using the general and driver-specific anomaly scores output from the plurality of the models 414, 434. The overall anomaly score $A_t$ for each point of time t may be calculated by the following equations:

$$A_t = \sqrt{\frac{1}{m}\sum_{j=1}^{m}(\phi_l(X_t) - X_t)^2} - \sqrt{\frac{1}{m}\sum_{j=1}^{m}(\phi_g(X_t) - X_t)^2}, (RMSE),$$

where $\Phi_l$ represents the driver-specific anomaly detection model, $\Phi_g$ represents the general anomaly detection model. In this embodiment, the overall anomaly score is defined as a difference between the driver specific anomaly score and the general anomaly score.

However, the way of calculating the overall anomaly score is not limited. In other example embodiments, the overall anomaly score $A_t$ may be defined as a ratio of driver specific anomaly score to the general anomaly score as follows:

$$A_t = \frac{\sqrt{\frac{1}{m}\sum_{j=1}^{m}(\phi_l(X_t) - X_t)^2}}{\sqrt{\frac{1}{m}\sum_{j=1}^{m}(\phi_g(X_t) - X_t)^2}}, (RMSE).$$

The way of calculating the accident risk score $S_t$ from the overall anomaly score $A_t$ is the same as the embodiment shown in FIGS. 1-6 unless otherwise noted.

According to one or more embodiments of the present invention, a technique capable of predicting a risk of an accident from sensor data by using an anomaly detection model is provided.

Generally, a task of predicting a risk of an accident during a pre-accident period based upon merely limited information such as sensor data available in standard driving recorders is challenging. Also note that a pure anomaly score calculated from the sensor data does not represent possibility of traffic accidents. A high anomaly score does not directly lead to a traffic accident. Also, the pure anomaly scores are high even during a normal driving period that is not relevant to the traffic accident.

In contrast, limiting the anomaly score so as not to exceed the predetermined value (i.e. ignoring detailed magnitude of the anomaly score above the threshold T) followed by the calculation of the accident risk score using the processed anomaly scores allows the evaluation of the consecutive abnormal or unusual driving behaviors appropriately, contrary to the expectation that more information leads to better prediction accuracy. The consecutive abnormal or unusual driving behaviors, which are detected as events where the anomaly score exceeds the threshold T, shows good correlation with the risk of the traffic accidents.

The technique does not require a camera or other expensive device and uses only recorded values obtained from sensors that are generally available in a modern automobile or its standard equipment. The usage of recorded values of the sensors would make the prediction possible at a low cost.

Hereinabove, the computer-implemented methods, the computer systems and the computer program products for predicting a risk of an accident has been described, in which the risk of the accident to be detected is a risk of a traffic accident involving an automobile. Although aforementioned features of the computer-implemented methods, the computer systems and the computer program products are preferable for predicting the traffic accident risk.

However, the computer-implemented methods, the computer systems and the computer program products according to one or more embodiments of the present invention are not limited to the aforementioned accident risk prediction systems, processes and program products for the traffic accidents. Accidents are not limited to accidents involving automobiles. An accident involving a vehicle other than the automobiles is also expected to be predictable. Any other self-propelled vehicles such as trucks (or lorries), buses, motorcycles (or two- or three-wheeled motor vehicle), heavy-duty vehicles (including heavy equipment), snowmobiles, watercraft, aircraft, etc. may also be contemplated. Furthermore, an accident without involving a vehicle is also expected to be predictable. Examples of such an accident includes occurrence of a poor health state or a disease such as brain stroke, heart attack, etc. Note that term 'accident' may be interpreted broadly. The meaning of the term 'accident' includes an unforeseen and unplanned event or circumstance, an unfortunate event resulting from carelessness or ignorance and an unexpected and medically important bodily event. Thus, the computer system may also be a mobile computer system such as a smartphone, tablet computer, smart watch, smart glass, etc., that is carried or worn by a target individual.

Having described the advantages obtained with respect to the one or more specific embodiments according to the present invention, it should be understood that some embodiments may not have these potential advantages and these potential advantages are not necessarily required of all embodiments.

Computer Hardware Component

Figure 8:
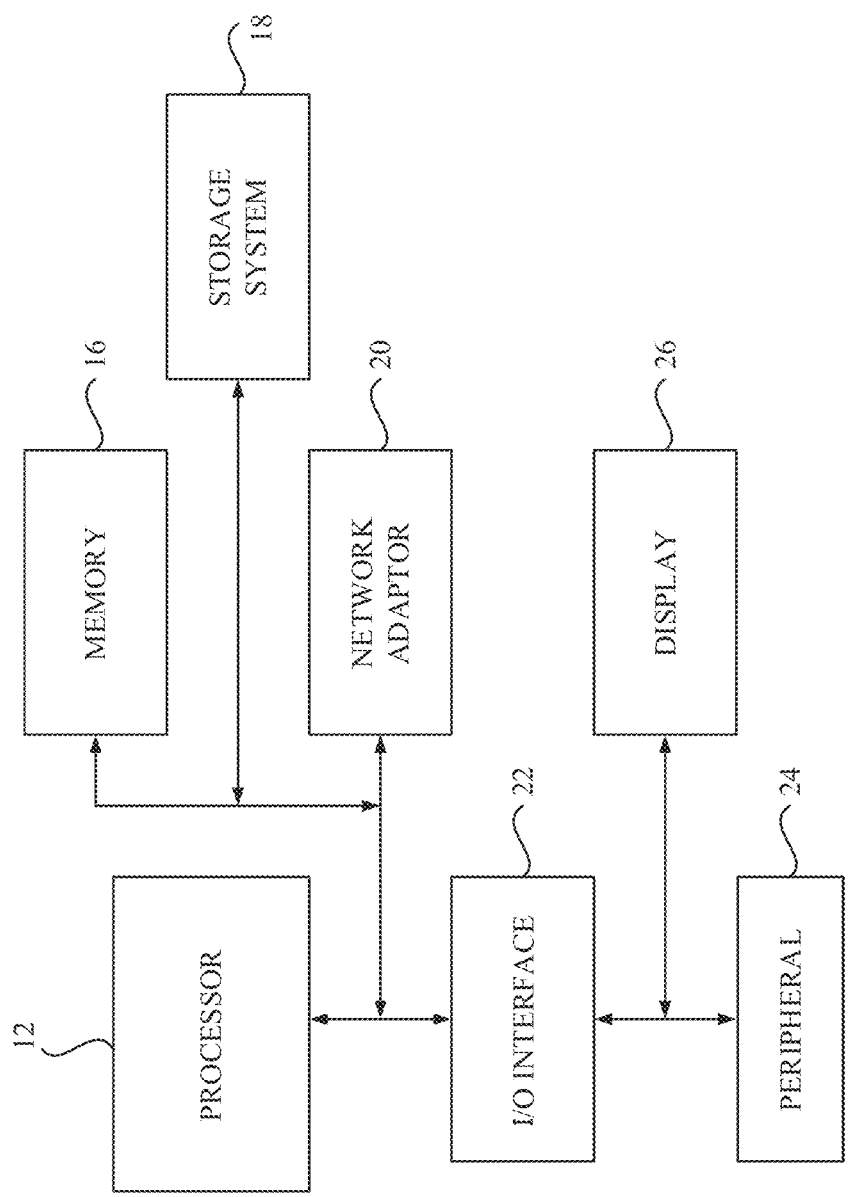
FIG. 8 depicts a computer system according to one or more embodiments of the present invention.

Referring now to FIG. 8, a schematic of an example of a computer system 10, which can be used for implementing the accident risk prediction system 100 (e.g., the on-device computer system 172), is shown. The computer system 10 shown in FIG. 8 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 8, the computer system 10 is shown in the form of a general-purpose computing device. The components of the computer system 10 may include, but are not limited to, a processor (or processing circuitry) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random-access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of predicting a risk of a car accident, the method comprising:

computing, by a processing device, an anomaly score based on sensor data indicating consecutive abnormal behaviors during a time period just before the car accident to obtain a series of anomaly scores;

processing the anomaly score to limit a processed anomaly score below a predetermined value;

calculating a car accident risk score at time of prediction by using a series of processed anomaly scores up to the time of the prediction; and outputting a prediction result based on the car accident risk score, wherein each processed anomaly score is generated by using a threshold with respect to the anomaly score, the threshold being determined by a learning process or optimization process; and wherein the anomaly score is processed by an activation function, the activation function squeezing the processed anomaly score into a range below the predetermined value when the threshold is exceeded.

2. The method of claim 1, wherein the car accident risk score is calculated by adding the processed anomaly scores up to the time of the prediction using a discount factor.

3. The method of claim 2, wherein the car accident risk score is a weighted sum of the processed anomaly scores with weights, the weights becoming smaller based on the discount factor as temporal distance from the time of the prediction increases.

4. The method of claim 2, wherein the car accident risk score is a sum of the processed anomaly scores within a predetermined period based on the discount factor.

5. The method of claim 1, wherein the activation function has a parameter to control a shape of the activation function.

6. The method of claim 1, wherein the anomaly score is processed by a step function, the step function outputting the predetermined value as the processed anomaly score when the threshold is exceeded.

7. The method of claim 1, wherein the prediction result indicates a presence or an extent of a risk of occurring the car accident in response to a detection condition related to the car accident risk score being satisfied, the detection condition being set in relation to a statistic of car accident risk scores calculated for a given set of sensor data.

8. The method of claim 1, wherein the anomaly score is computed by using a general model for generating a general anomaly score and a specific model for generating a specific anomaly score, the specific model being trained with a set of sensor data related to a specific individual.

9. The method of claim 1, wherein the anomaly score is computed from a time series model having an architecture of a dynamic Boltzmann machine.

10. The method of claim 1, wherein the sensor data includes a vector including a plurality of values selected from a group consisting of accelerations of x, y and z axes, angular velocities of roll, pitch and yaw axes, a vehicle speed, a steering angle, latitude, longitude, height, an azimuth, a depression amount and a depression velocity of an accelerator pedal, a position of a throttle valve, a depression amount and a depression velocity of a brake pedal, and processed values obtained therefrom.

11. A computer system for predicting a risk of a car accident, by executing program instructions, the computer system comprising:

a memory tangibly storing the program instructions;

a processor in communications with the memory, wherein the processor is configured to:

compute an anomaly score based on sensor data indicating consecutive abnormal behaviors during a time period just before the car accident to obtain a series of anomaly scores;

process the anomaly score to limit a processed anomaly score below a predetermined value;

calculate a car accident risk score at time of prediction by using a series of processed anomaly scores up to the time of the prediction; and output a prediction result based on the car accident risk score, wherein each processed anomaly score is generated by using a threshold with respect to the anomaly score; and wherein the anomaly score is processed by an activation function, the activation function squeezing the processed anomaly score into a range below the predetermined value when the threshold is exceeded.

12. The computer system of claim 11, wherein the processor is configured to:

add the processed anomaly scores up to the time of the prediction using a discount factor to calculate the car accident risk score.

13. The computer system of claim 11, wherein the car accident risk score is a weighted sum of the processed anomaly scores with weights, the weights becoming smaller based on the discount factor as temporal distance from the time of the prediction increases.

14. The computer system of claim 11, wherein each processed anomaly score is generated by using a threshold with respect to the anomaly score, the threshold being determined by a learning process or optimization process.

15. The computer system of claim 11, wherein the computer system is an apparatus selected from a group consisting of an in-vehicle computer system; an on-device computer system of a driving recorder; a mobile computer system brought into a vehicle; a mobile computer system carried or worn by a target individual; and a general purpose computing system receiving sensor data from an vehicle.

16. A computer program product for predicting a risk of a car accident, the computer program product comprising a computer readable storage medium having program instructions embodied therewith, the program instructions executable by a computer to cause the computer to perform a computer-implemented method comprising:

computing an anomaly score based on sensor data indicating consecutive abnormal behaviors during a time period just before the car accident to obtain a series of anomaly scores;

processing the anomaly score to limit a processed anomaly score below a predetermined value;

calculating a car accident risk score at time of prediction by using a series of processed anomaly scores up to the time of the prediction; and outputting a prediction result based on the car accident risk score, wherein each processed anomaly score is generated by using a threshold with respect to the anomaly score; and wherein the anomaly score is processed by an activation function, the activation function squeezing the processed anomaly score into a range below the predetermined value when the threshold is exceeded.

17. The computer program product of claim 16, wherein the car accident risk score is calculated by adding the processed anomaly scores up to the time of the prediction using a discount factor.

18. The computer program product of claim 16, wherein the car accident risk score is a weighted sum of the processed anomaly scores with weights, the weights becoming smaller based on the discount factor as temporal distance from the time of the prediction increases.

* * * * *